Sept. 8, 1931.  C. D. NEWTON ET AL  1,822,783
NEGATIVE HOLDER
Filed Jan. 22, 1930  2 Sheets-Sheet 1
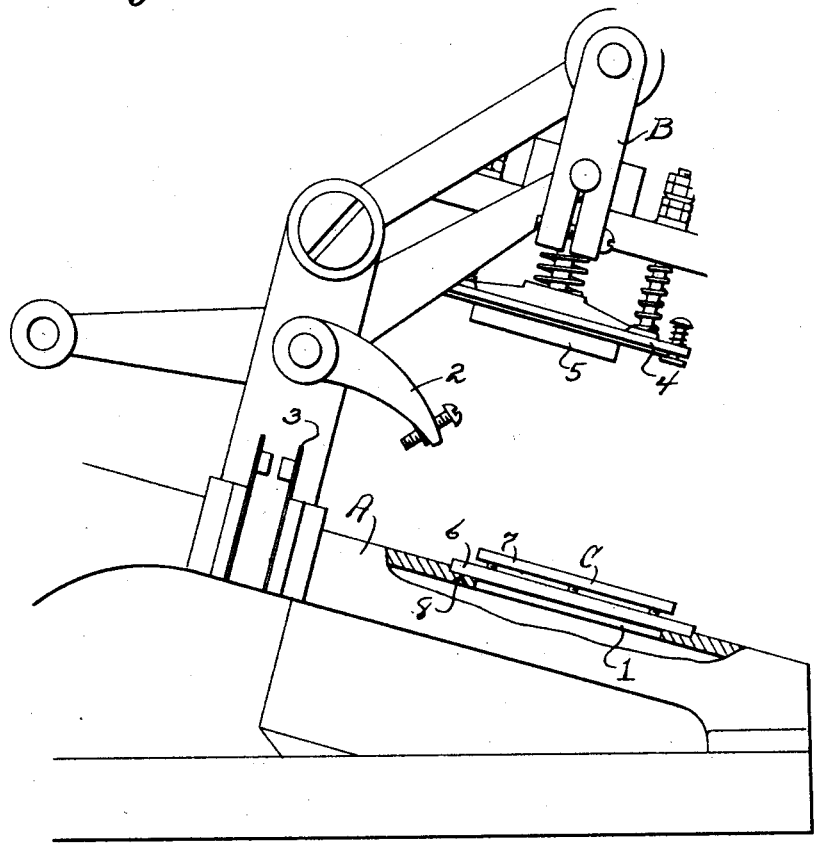
Fig. 1.
Fig. 2.
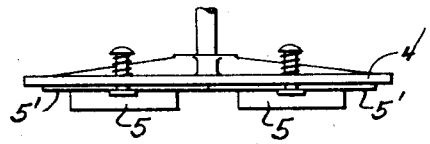
Carl D. Newton
Roberto DeSilva
INVENTOR
BY Victor J. Evans
ATTORNEY Sept. 8, 1931.   C. D. NEWTON ET AL   1,822,783
NEGATIVE HOLDER
Filed Jan. 22, 1930   2 Sheets-Sheet 2

Carl D. Newton
Roberto De Silva
INVENTOR

BY Victor J. Evans
ATTORNEY

Patented Sept. 8, 1931

1,822,783

UNITED STATES PATENT OFFICE

CARL D. NEWTON AND ROBERTO DE SILVA, OF SAN ANTONIO, TEXAS; SAID DE SILVA ASSIGNOR TO SAID NEWTON

NEGATIVE HOLDER

Application filed January 22, 1930. Serial No. 422,603.

This invention relates to a negative holder which is mainly designed for use with the photographic printing machine forming the subject matter of a patent granted to Roberto de Silva, on January 21, 1930, No. 1,744,621, the general object of the invention being to provide a frame for fixedly holding a negative or several negatives, with means whereby the sensitized paper or other medium which is to receive the positive can be quickly and easily placed in the frame on the negative to be pressed thereon by the pad of the machine, so that any desired number of positives can be printed very quickly.

Another object of the invention is to make the frame of two parts, with means for attaching the parts together with the negative or negatives between them so that the negative or negatives are fixedly held in position, the invention being particularly adapted for use in printing borders on positives, whereby the body of the positive is protected from light rays and before development is later exposed to a second negative, after which said print is developed in the usual manner, giving a positive with a picture image as showing from the second negative and having a border as shown in the border negative, as hereinafter described.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a partial elevation, with parts in section, showing the invention in use with the apparatus forming the subject matter of the above entitled application.

Figure 2 is a view of the presser plate of the machine, with a pair of pads thereon for use with a frame supporting two negatives.

Figure 3:
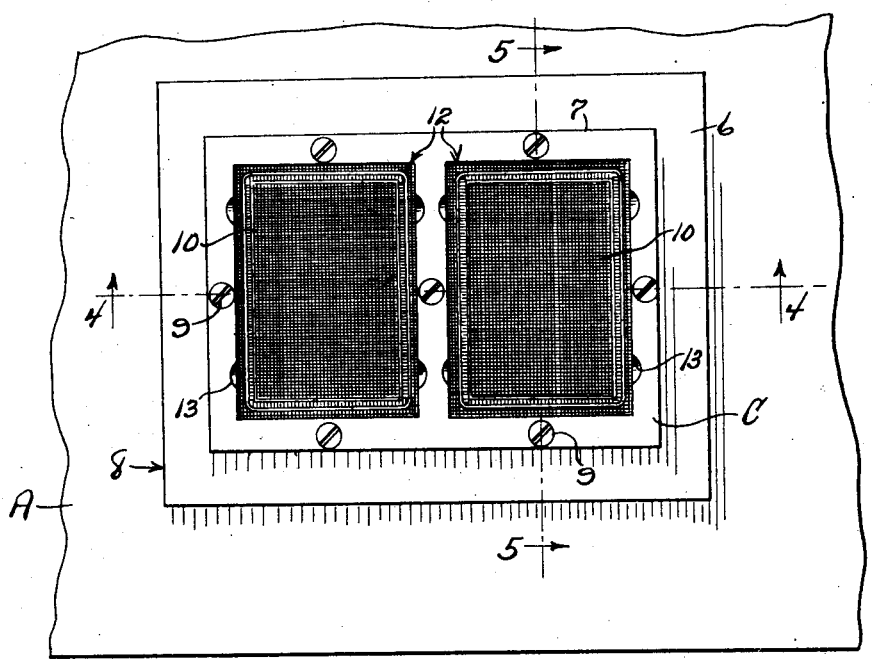
Figure 3 is a top plan view of a portion of the table of the machine, showing the invention thereon.
Figure 4:
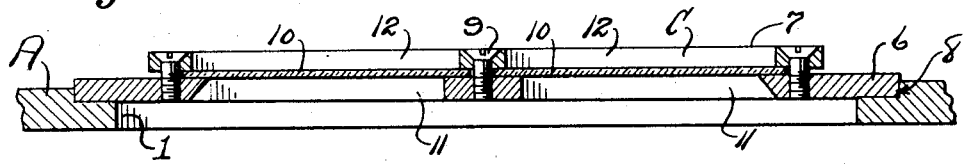
Figure 4 is a section on line 4—4 of Figure 3.
Figure 5:
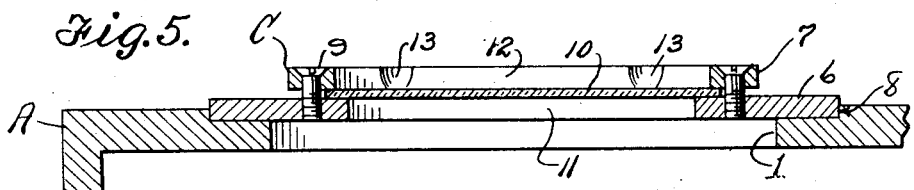
Figure 5 is a section on line 5—5 of Figure 3.

In these drawings, the letter A indicates the table of the apparatus forming the subject matter of the before mentioned application, which is formed with the opening 1 in its inclined part through which the rays of light from a lamp placed in the chamber under the opening will pass when the presser assembly B moves downwardly and causes the arm 2 to close the switch 3 of the circuit of the lamp or lamps, the member B including a spring pressed presser plate 4 which carries one or more pads 5, according to the number of negatives carried by the frame C.

In carrying out our invention, we form the frame C of the two sections 6 and 7, the section 6 fitting in the countersunk recess 8 which surrounds the opening 1 and the section 7 being detachably connected with the section 6 by the screws 9, so that a negative 10 is clamped between the two sections when the screws are tightened. The opening 11 in the section 6 is equal to or of smaller area than the opening 12 in the section 7. The walls of the opening 12 in the section 7 form a space to receive the sensitized medium on which the positives are printed, and the pad 5 is so shaped that it will fit within the recess and thus firmly press the sensitized medium upon the negative.

From the foregoing it will be seen that after the negative is clamped between the frame and the frame placed in the recess 8, it is simply necessary to place the sheet of sensitized material in the recess formed by the opening 12 so that it will be pressed against the negative when the presser assembly B is lowered. After the print is made and the assembly B raised, the sensitized sheet is removed and another one put in place. Thus prints can be made from a negative in the minimum amount of time and with the least possible effort. The walls of the opening 12 are formed with curved notches 13 to facilitate the placing of the sensitized sheet in the opening and its removal therefrom.

When prints are to be made from a number of negatives, the frames are made with a number of openings 11 and 12, as shown in the drawings, which show a frame constructed to support two negatives. In this case, the pressure plate would carry a pair of pads 5, as shown in Figure 2.

Figure 6:
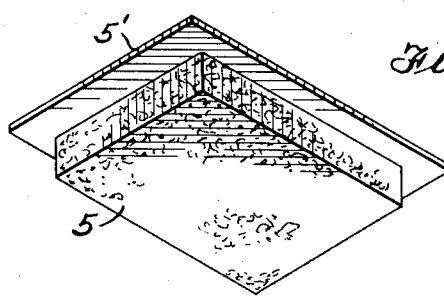
Figure 6 is a perspective view of one of the pad members on the presser plate.

Figure 6 shows a pad 5 carried by a plate 5' which is detachably connected with the presser plate 4 of the assembly B.

Thus it will be seen that we have provided a frame for use with the printing apparatus forming the subject matter of the before mentioned application, whereby a negative of any material is clamped between the sections of the frame in such a way that it is firmly held in position so that any number of prints can be made from the negative in the minimum amount of time. This manner of supporting the negative insures a perfect alignment between the negative and the sensitized medium.

It is thought from the foregoing description that the advantages and novel features of the invention will be readily apparent.

It is to be understood that changes may be made in the construction and in the combination and arrangement of the several parts, provided that such changes fall within the scope of the appended claim.

What we claim is:—

A negative holding frame for a photographic printing apparatus, comprising a lower plate, an upper plate, screws for detachably fastening the upper plate to the lower plate, with a negative clamped between the plates, each plate having an opening therein for exposing portion of the negative, with the opening in the upper plate of larger area than the opening in the lower plate.

In testimony whereof we affix our signatures.

CARL D. NEWTON.
ROBERTO DE SILVA.